United States Patent [19]

Schwartz et al.

[11] 4,343,982
[45] Aug. 10, 1982

[54] METHOD OF JOINING METAL TO GRAPHITE BY SPOT WELDING

[75] Inventors: Stephan Schwartz, Vaxholm; Roland Söderström, Akersberga; Ake Bjareklint, Vallentuna, all of Sweden

[73] Assignee: Energy Development Associates, Inc., Madison Heights, Mich.

[21] Appl. No.: 246,841

[22] Filed: Mar. 23, 1981

[51] Int. Cl.³ .............................................. B23K 11/16
[52] U.S. Cl. ..................................... 219/118; 219/86.1
[58] Field of Search ..................... 429/178; 219/92, 94, 219/86.1, 86.22, 149, 78.16, 127, 118

[56] References Cited

U.S. PATENT DOCUMENTS

| | | | |
|---|---|---|---|
| 2,356,049 | 8/1944 | Goodwin | 219/92 |
| 3,300,854 | 1/1967 | Jackson | 219/92 X |
| 3,878,356 | 4/1975 | Roye | 219/118 |
| 4,071,660 | 1/1978 | Hart . | |
| 4,100,332 | 7/1978 | Carr . | |
| 4,166,210 | 8/1979 | Eberli | 219/86.22 |

*Primary Examiner*—Elliot A. Goldberg
*Attorney, Agent, or Firm*—Harness, Dickey & Pierce

[57] ABSTRACT

A method of joining two metal members to a graphite member to form a structure having a low transition resistance is described. The method includes the steps of providing a plurality of openings in the graphite member, interposing the graphite member between the two metal members and positioning the metal members to cover the openings in the graphite member, and resistance spot welding the metal members to the graphite member at the openings in the graphite member. This method is advantageous in forming a bus-bar connection between a pair of opposite polarity graphite electrodes in an electrochemical cell stack, such as a zinc-chloride battery. In this particular application, it is preferred that titanium be used for the metal members.

23 Claims, 4 Drawing Figures

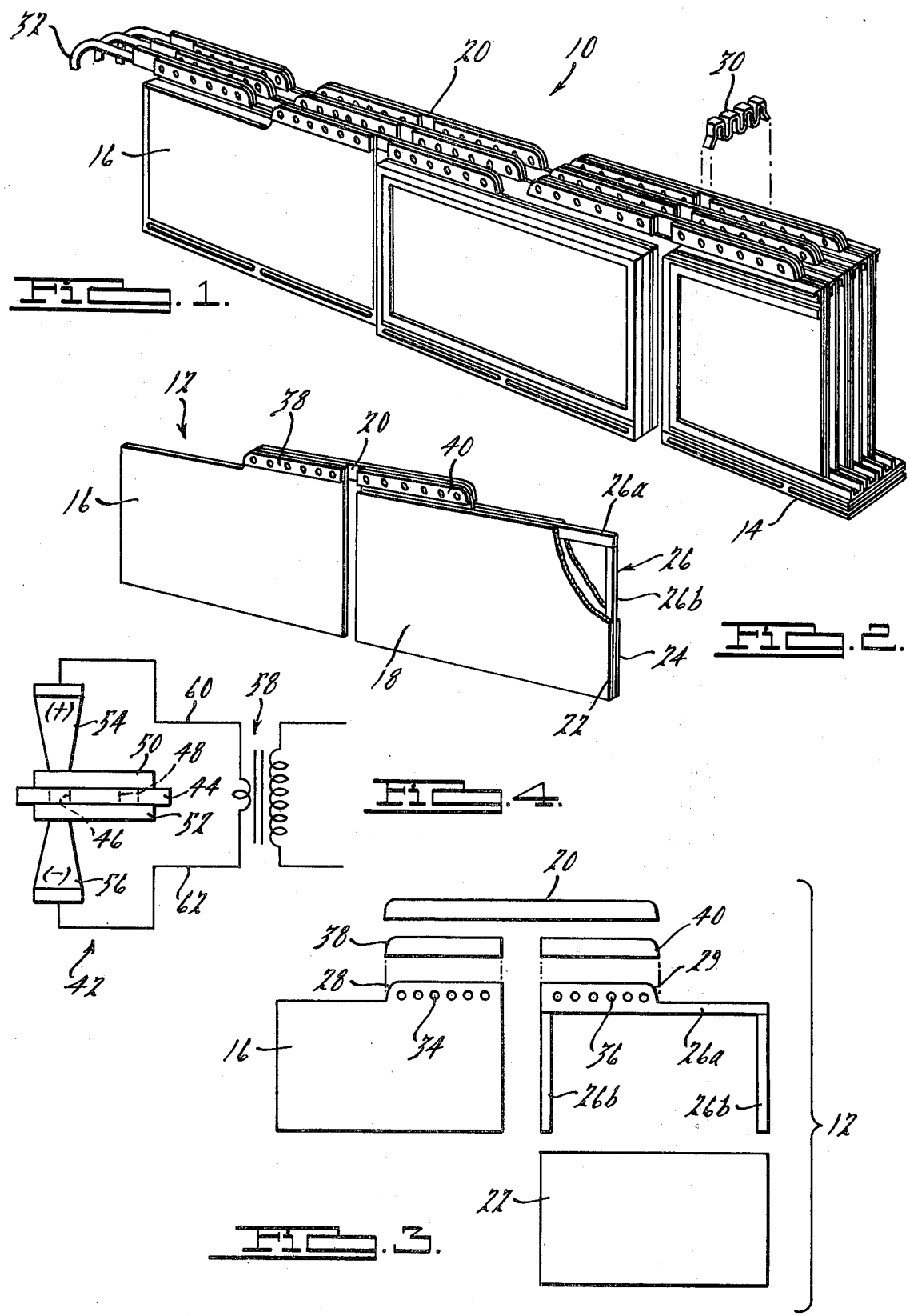

METHOD OF JOINING METAL TO GRAPHITE BY SPOT WELDING

BACKGROUND AND SUMMARY OF THE INVENTION

The present invention relates generally to joining metal to graphite, and particularly to forming a bus-bar connection between a pair of graphite electrodes for use in an electrochemical cell.

Graphite is used in many industrial fields, including chemical, electrical, metallurgical, electrochemical, nuclear, and rocket fields. In several of these areas of manufacture, it is desirable to join metal to graphite. In the field of electrochemistry, graphite is widely used as an electrode material due to its electrical and thermal characteristics, and because it is one of the most inert materials with respect to chemical reactions. Furthermore, in this field, suitable metals having low electrical resistivity are used as a bus-bar material for joining two or more graphite electrodes together. In this particular application, it is important to achieve a low transition or contact resistance between the metal bus-bar and graphite electrodes being joined in order to minimize voltaic losses.

One such electrochemical application is the zinc-chloride battery, where graphite is employed for both the positive and negative electrodes. During the charging of the battery, zinc metal is electrodeposited on the negative or zinc electrode and chlorine gas is generated at the positive or chlorine electrode from an aqueous zinc-chloride electrolyte. During the discharging of the battery, the reactions are reversed to generate electricity from the terminals of the battery. The zinc electrode is constructed from dense or fine grained graphite, and the chlorine electrode is constructed from a liquid permeable porous graphite.

One technique of joining metal to graphite is described in U.S. Pat. No. 4,100,332, issued on July 11, 1978, entitled "Comb Type Bipolar Electrode Elements And Battery Stacks Thereof", and is herein incorporated by reference. In this patent, it is taught to provide for a press or interference fit between the graphite electrodes and the graphite or valve metal bus-bar wall. Accordingly, the electrodes are constructed slightly thicker than the grooves in the bus-bar, so that when pressed in they may be retained by a pressure fit. It is also stated that the electrodes may be connected to the bus-bar by cementing, plasma spraying at the point of contact, or welding.

Another zinc-chloride battery stack design is described in U.S. Pat. No. 4,071,660, issued Jan. 31, 1978, entitled "Electrode For A Zinc-Chloride Battery And Batteries Containing The Same", and is herein incorporated by reference. In this patent, it is taught to provide an interference fit between graphite electrodes and a titanium bus-bar in one instance, and a cemented connection between graphite electrodes and a titanium bus-bar in another instance. It should also be noted that in addition to the cement and interference fit connections, bolt connections have also been employed to join metal to graphite.

The present invention provides a novel method of joining metal to graphite which results in a low transition or contact resistance. Particularly, the method comprises: providing a plurality of openings in a graphite member to be joined, interposing the graphite member between two metal members and positioning the metal members to cover the openings in the graphite member, and resistance spot welding the metal members to the graphite member at the openings in the graphite member. The resistance spot welding may be accomplished with one or more pairs of opposing welding electrodes for a sequential or simultaneous spot welding at the openings in the graphite member. The welding electrodes are used to apply a predetermined amount of pressure to the metal members at the opening selected for spot welding, and sufficient electrical current is passed through the welding electrodes to spot weld the metal members together through the opening.

During the resistance spot welding, at least a portion of the metal from the two metal members flows into the opening of the graphite member under the pressure of the welding electrodes, and the gap between the metal members is bridged. As the metal cools, it contracts thereby exerting a force drawing the two metal members together to achieve a good electrical contact with the graphite member. Some penetration of the metal into the pores of the graphite member also occurs.

In the zinc-chloride battery application, it is preferred that titanium or tantalum be used for the metal members. These particular metals have a relatively low electrical resistivity compared to graphite, and are generally chemically resistant or inert to the zinc-chloride electrolyte and other chemical entities with which they will come into contact. Although titanium is extremely reactive above 1000° F. in an oxygen and nitrogen atmosphere, it has been found that no special atmospheric shielding is required for the resistance spot welding.

Other features and advantages of the present invention will become apparent in view of the drawings and the following detailed description of the preferred embodiment.

BRIEF DESCRIPTION OF THE DRAWINGS

FIG. 1 is a perspective view of a section of a zinc-chloride battery stack constructed in accordance with the present invention.

FIG. 2 is a perspective view of an electrode pair forming a portion of the battery stack of FIG. 1.

FIG. 3 is a front elevation assembly view of the electrode pair of FIG. 2.

FIG. 4 is a schematic representation of an arrangement for resistance spot welding metal to graphite.

DETAILED DESCRIPTION OF THE PREFERRED EMBODIMENT

Referring to FIG. 1, a perspective view of a section of a zinc-chloride battery stack 10 is shown. Battery stack 10 is generally comprised of a plurality of electrode pairs 12, shown individually in FIG. 2, and a plastic frame 14. Each electrode pair 12 is comprised of a zinc electrode 16, a chlorine electrode structure 18, and a bus-bar 20 coupling the zinc electrode to the chlorine electrode structure. Chlorine electrode structure 18 includes a pair of chlorine electrode members 22 and 24 joined to a graphite frame 26. Zinc electrode 16 is preferably constructed from a dense or fine grained graphite, as exemplified by Union Carbide Corp. ATJ or EBP graphites. The zinc electrode also includes a tab portion 28 projecting from the top of the electrode to provide a surface area for connection to bus-bar 20.

Chlorine electrode members 22 and 24 are preferably constructed from liquid-permeable but gas-impermeable porous graphite, as exemplified by Union Carbide Corp. PG-60 or Airco Speer 37-G graphite. Graphite frame 26 is also preferably constructed from dense graphite, and serves to separate the two chlorine electrode members and acts as an electrical conduit. This graphite frame is comprised of top leg 26a and a side leg 26b at each end of the chlorine electrode structure. The graphite frame also includes a tab portion 29 which is used to electrically connect chlorine electrode structure 18 to the bus-bar 20. A detailed description of the connection between electrode members 22 and 24 and the graphite frame 26 is set forth in a co-filed U.S. patent application entitled "A Method Of Joining Graphite To Graphite", assigned to the assignee of the present invention, and is herein incorporated by reference.

Plastic frame 14 is preferably constructed from thermoplastic resins which are chemically resistant to the zinc-chloride battery environment, as exemplified by General Tire & Rubber Corp. Boltron polyvinyl chloride (4008-2124), Dupont Teflon (tetrafluorinaded ethylene), and Pennwalt Kynar (polyvinylidene fluoride). Plastic frame 14 serves to align and separate electrode pairs 12, and provides a means to convey the electrolyte to chlorine electrode structure 18. The chlorine electrode structure is open at the bottom between electrode members 22 and 24 to receive electrolyte, as graphite frame 26 does not include a bottom leg.

Bus-bar 20 preferably constructed from titanium or tantalum due to their mechanical strength, electrical conductivity, and resistance to chemical corrosion in the zinc-chloride battery environment. This bus-bar serves as a current collector and connects adjacent cells of battery stack 10 electrically in series. Current sharing is facilitated between the cells arranged in parallel by a clip-on titanium strip 30, which is used to connect bus-bars of the same polarity together. At each end of battery stack 10, a set of conduits 32 is connected to the tab portion of the end cells. These conduits lead to an external battery terminal on each side of the battery stack for connection to a power supply for charging the battery or a load for discharging the battery.

Referring to FIG. 3, a front elevation assembly view of electrode pair 12 is shown, and serves to illustrate the method of joining bus-bar 20 to zinc electrode 16 and to the graphite frame 26 of chlorine electrode structure 18. A plurality of holes of openings 34 are provided in tab portion 28 of zinc electrode 16, and similarly a plurality of openings 36 are provided in tab portion 29 of graphite frame 26. Openings 34 and 36 are generally aligned along the length of their respective tab portions 28 and 29, and the position of zinc electrode 16 and chlorine electrode structure 18 in battery stack 10 is such that openings 34 are also aligned with openings 36. Bus-bar 20 has a sufficient length and width to completely cover one side of both openings 34 and 36 when placed in the position shown in FIG. 2. A pair of support members 38 and 40 are also provided and sized to cover the opposite sides of these openings, with support member 38 for covering openings 34 and support member 40 for covering openings 36. Accordingly, after drilling or otherwise providing for openings 34 in zinc electrode 16, tab portion 28 is interposed between bus-bar 20 and support member 38 such that openings 34 are completely covered. Similarly, tab portion 29 of chlorine electrode structure 18 is interposed between bus-bar 20 and support member 40 such that openings 36 are completely covered. Bus-bar 20 and support member 38 are then resistance spot welded to zinc electrode 16 at openings 34. Similarly, bus-bar 20 and support member 40 are resistance spot welded to graphite frame 26 of chlorine electrode structure 18 at openings 36. Although six openings are provided in both zinc electrode 16 and chlorine electrode structure 18, this number is not critical and may be varied depending on the materials used and the size of the surfaces to be joined.

Referring to FIG. 4, a schematic representation of an arrangement 42 for resistance spot welding is illustrated. A graphite member 44 is provided with a plurality of openings 46 and 48. Graphite member 44 is interposed between two metal members 50 and 52, and these metal members are positioned to cover openings 46 and 48. A pair of opposing welding electrodes 54 and 56 are provided to spot weld metal members 50 and 52 to graphite member 44 at opening 46. Welding electrode 54 is positioned on metal member 50 and welding electrode 56 is positioned under metal member 52 such that the welding electrodes are aligned with opening 46. Welding electrodes 54 and 56 are connected to a transformer 58 via electrical conduits 60 and 62. Transformer 58 is adapted to produce a sufficiently high electrical current to resistance spot weld metal members 50 and 52 to graphite member 44. Before the electrical current is passed through welding electrodes 54 and 56, a predetermined amount of pressure is applied to metal members 50 and 52 by the welding electrodes. During the resistance spot welding, a portion of the metal from metal members 50 and 52 flows into opening 46 under the pressure of welding electrodes 54 and 56. A column of metal is thereby formed in the opening, and the gap between metal members 50 and 52 is bridged. After the flow of electrical current ceases and as the column of metal formed cools, it contracts and exerts a force drawing metal members 50 and 52 together. Accordingly, the welding of metal members 50 and 52 together achieves a good electrical contact between the metal members and graphite member 44 by the compression of the metal members against the graphite member. Furthermore, some penetration of the metal from metal members 50 and 52 into the pores of graphite member 44 also occurs. The degree of this penetration is dependent upon the porosity of graphite member 44. This penetration also inhances the electrical contact between metal members 50 and 52 and graphite member 44. It will also be appreciated by those skilled in the art that the column of metal formed in opening 46 provides direct electrical contact between metal members 50 and 52. This becomes important when one of the metal members is acting as a current collecting bus-bar, such as bus-bar 20 of FIGS. 1-3. Thus, support members 38 and 40 will in essence form a part of bus-bar 20 after welding, and thereby increase the contact surface area used to transfer current between the electrodes and the bus-bar. Again, the increased contact surface area will enhance the electrical connection and reduce the voltaic losses in battery stack 10.

It will also be appreciated by those skilled in the art that welding electrodes 54 and 56 may be used to resistance spot weld metal members 50 and 52 to graphite member 44 at opening 48. Alternatively, another set of welding electrodes may be provided so that the spot welding at openings 46 and 48 may occur simultaneously. Accordingly, each spot weld at openings 34 and 36 in electrode pair 12 may be accomplished consequentively with one set of welding electrodes or a plurality of welds may be accomplished simultaneously with a corresponding plurality of welding electrodes.

EXAMPLE

Dense graphite has been joined to two titanium metal bars in the following manner. A suitable number of openings were provided in an ATJ grade graphite plate. The two titanium bars were sandblasted with fine sand to clean the surface of any oxide layer or grease that may have been present. It should be noted that other surface preparation techniques well known in the art may also be employed. Both the graphite plate and the titanium bars had a thickness of one millimeter, and the openings in the graphite plate had a diameter of two millimeters. After the titanium bars were positioned to cover the openings in the graphite plate, a pressure of 100 kg was applied to the titanium bars at the first opening selected for welding by a pair of opposing welding electrodes. A short current pulse of two-three periods was passed through the welding electrodes to achieve the spot weld. The welding equipment used was a ESAB SVPR 753, and the welding surface area of the welding electrodes was thirty millimeters squared. Even though titanium is extremely reactive in an oxygen and nitrogen atmosphere above 1000° F., it was found that no special atmosphere shielding (such as argon or helium gas) was required for the resistance spot welding. Due to the gas impermeability of the materials used and the arrangement employed, only a small amount of air was available in the openings of the graphite plate. Although some oxidation may possibly have occurred, it did not affect the integrity of the electrical contact achieved.

It will be appreciated by those skilled in the art that various changes and modifications may be made to the method and structure described in this specification without departing from the spirit and scope of the invention as defined by the appended claims. For example, the amount of pressure applied, the size of the openings, and time and amount of electrical current used, are dependent upon the selection and dimensions of the materials selected, such as employing porous graphite instead of dense graphite. The various embodiments which have been set forth were for the purpose of illustration and were not intended to limit the invention.

What is claimed is:

1. A method of joining two metal members to a graphite member to form a structure having a low-transition resistance, comprising the steps of:
   (a) providing a plurality of openings in said graphite member;
   (b) interposing said graphite member between said metal members and positioning said metal members to cover said openings in said graphite member; and
   (c) resistance spot welding said metal members to said graphite member at said openings in said graphite member.

2. The method according to claim 1, wherein said metal members are spot welded together through said openings in said graphite member.

3. The method according to claim 2, wherein said metal members are constructed from titanium, and said graphite member is constructed from dense graphite.

4. The method according to claim 3, further including the step of cleaning said titanium members to remove any oxide layer or grease from the surfaces thereof.

5. The method according to claim 4, wherein said titanium members are cleaned by sandblasting.

6. The method according to claim 2, wherein said metal members are constructed from tantalum, and said graphite member is constructed from dense graphite.

7. A method of joining metal to graphite, comprising the steps of:
   (a) providing a plurality of openings in a graphite member to be joined;
   (b) interposing said graphite member between two metal members and positioning said metal members to cover said openings in said graphite member; and
   (c) resistance spot welding said metal members together through said openings in said graphite member.

8. The method according to claim 2, wherein said spot welding at each of said openings in said graphite member occurs simultaneously.

9. The method according to claim 7, wherein said spot welding at each of said openings in said graphite member occurs successively.

10. The method according to claim 8, wherein a pair of opposing welding electrodes is provided for said spot welding.

11. The method according to claim 9, wherein a predetermined amount of pressure is applied to said metal members during said spot welding.

12. A method of joining metal to graphite, comprising the steps of:
   (a) providing a plurality of openings in a graphite member to be joined;
   (b) interposing said graphite member between two metal members and positioning said metal members to cover said openings in said graphite member;
   (c) applying a predetermined amount of pressure to said metal members with a pair of opposing welding electrodes aligned with one of said openings in said graphite member;
   (d) passing sufficient electrical current through said welding electrodes to spot weld said metal members together through said openings; and
   (e) repeating steps (c) and (d) until said metal members have been spot welded together at each of said openings in said graphite member.

13. The method according to claim 12, wherein said graphite member is a dense graphite plate, and said openings therein are spaced in alignment.

14. The method according to claim 13, wherein each of said metal members is a titanium bar having a width greater than the diameter of said openings in said dense graphite plate but substantially less than the width of said graphite plate.

15. The method according to claim 14, wherein said openings in said dense graphite plate are provided in a tab portion of said dense graphite plate.

16. The method according to claim 15, wherein said dense graphite plate is an electrode adapted for use in an electrochemical cell, and one of said titanium bars is a bus-bar adapted to provide an electrical connection to said dense graphite electrode.

17. A method of forming a bus-bar electrical connection between a pair of opposite polarity graphite electrodes positioned generally end-to-end in an electrochemical cell stack, comprising the steps of:
   (a) providing a plurality of aligned openings in both of said graphite electrodes;
   (b) providing a metal bus-bar member having a size sufficient to extend between and cover a first side of said openings for both of said graphite electrodes, and providing a pair of metal support members each having a size sufficient to cover a second opposing side of said openings for one of said graphite electrodes;

(c) positioning said metal bus-bar member to extend between and cover said first side of said openings for both of said graphite electrodes, positioning one of said metal support members to cover said second opposing side of said openings for one of said graphite electrodes, and positioning the other of said metal support members to cover said second opposing side of said openings for the other of said graphite electrodes; and (d) resistance spot welding said metal bus-bar member and said pair of metal support members to said pair of graphite electrodes at each of said openings in said graphite members.

18. The method according to claim 17, wherein said openings are provided in a tab portion of said graphite electrodes.

19. The method according to claim 18, wherein said tab portions are disposed above an active surface area of said graphite electrodes.

20. The method according to claim 17, wherein said metal bus-bar member and said metal support members are constructed from titanium.

21. The method according to claim 20, wherein said electrochemical cell stack is a zinc-chloride cell stack.

22. The method according to claim 21, wherein one of said graphite electrodes is a zinc electrode, and the other of said graphite electrodes is a chlorine electrode structure.

23. The method according to claim 22, wherein said zinc electrode and at least said tab portion of said chlorine electrode structure are constructed from dense graphite.

* * * * *

UNITED STATES PATENT AND TRADEMARK OFFICE
CERTIFICATE OF CORRECTION

PATENT NO. : 4,343,982

DATED : August 10, 1982

INVENTOR(S) : Schwartz, Stephan; Soderstrom, Roland; Bjareklint, Ake

It is certified that error appears in the above–identified patent and that said Letters Patent are hereby corrected as shown below:

Column 5, line 24, "atmosphere" should be --atmospheric--

Signed and Sealed this

Twelfth Day of July 1983

[SEAL]

Attest:

GERALD J. MOSSINGHOFF

Attesting Officer

Commissioner of Patents and Trademarks